T. OTT.
Improvement in Lathes for Turning Bent Sticks.
No. 130,237.  Patented Aug. 6, 1872.
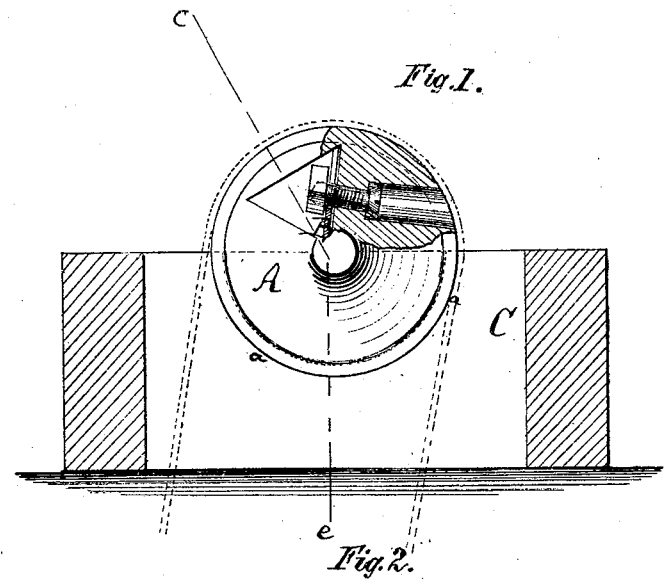
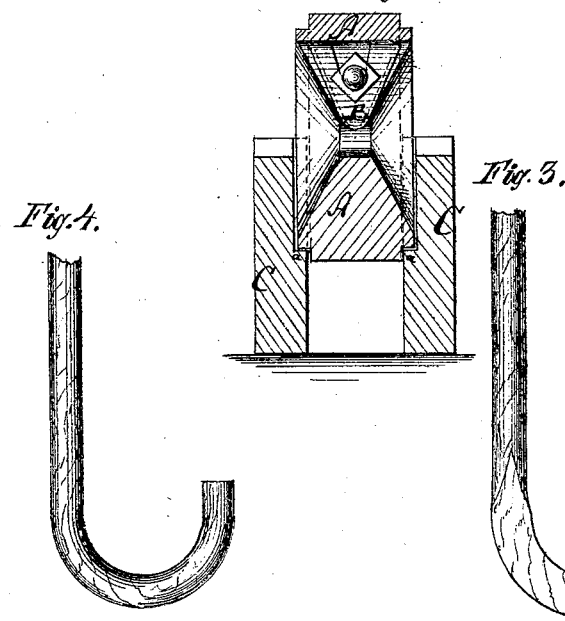
Witnesses:
P. C. Dieterich
Alex F. Roberts
Inventor:
T. Ott
per
Attorneys.

UNITED STATES PATENT OFFICE.

THOMAS OTT, OF SOUTH GREEN TOWNSHIP, PIKE COUNTY, PENNSYLVANIA, ASSIGNOR TO HIMSELF AND NATHAN HOUCK, OF SAME PLACE.

IMPROVEMENT IN LATHES FOR TURNING BENT STICKS.

Specification forming part of Letters Patent No. 130,237, dated August 6, 1872.

Specification describing a new Improvement in Lathes for Turning Bent Sticks, invented by THOMAS OTT, of South Green Township, in the county of Pike and State of Pennsylvania.

Figure 1 represents a side view, partly in section, of my improved annular chuck. Fig. 2 is a transverse section of the same on the line $c\,e$, Fig. 1. Fig. 3 is a side view of a stick not turned, and Fig. 4 a side view of a stick turned on the chuck.

Similar letters of reference indicate corresponding parts.

This invention has for its object to produce a simple apparatus for turning the hooks at the ends of umbrella-sticks and other bent sticks; and consists in the use of an annular chuck, carrying a cutter at its narrow inner edge, and hollowed at the faces to be as thin as possible along the inner edge, as hereinafter more fully described.

A in the drawing represents an annular chuck or block made of wood or other suitable material, and slotted out to receive a knife, B, whose cutting-edge projects beyond the inner periphery of the chuck, as shown. The cutter B is preferably slotted, as shown, to be adjustable as its edge wears. The faces of the annular chuck are hollowed to make it as thin as possible in the middle, which is clearly shown in Fig. 2.

The chuck is rested on semicircular shoulders $a\,a$ of a supporting-frame, C, and revolved by a belt embracing it, or by friction-rollers, or otherwise. The stick to be turned is in ordinary machines first turned where it is straight, as in Fig. 3, the curved part being reserved for my improved chuck. In the latter the stick is fed through the center to be brought in contact with the cutting-edge of the rotating knife. Being thin in the middle, the chuck permits the stick to be held at such varying angles as to allow its entire bent portion to be turned to uniform thickness.

Having thus described my invention, I claim as new and desire to secure by Letters Patent—

The chuck A, concaved on each side toward the middle, and provided with knife B to adapt it to turn bent sticks of wood, in the manner set forth.

THOMAS OTT.

Witnesses:
GEO. W. MABEE,
T. B. MOSHER.